April 28, 1953
C. C. CUTLER
2,637,025
STEREOSCOPIC OBJECT LOCATION SYSTEM
USING RADAR TECHNIQUE
Filed April 1, 1944
3 Sheets-Sheet 2
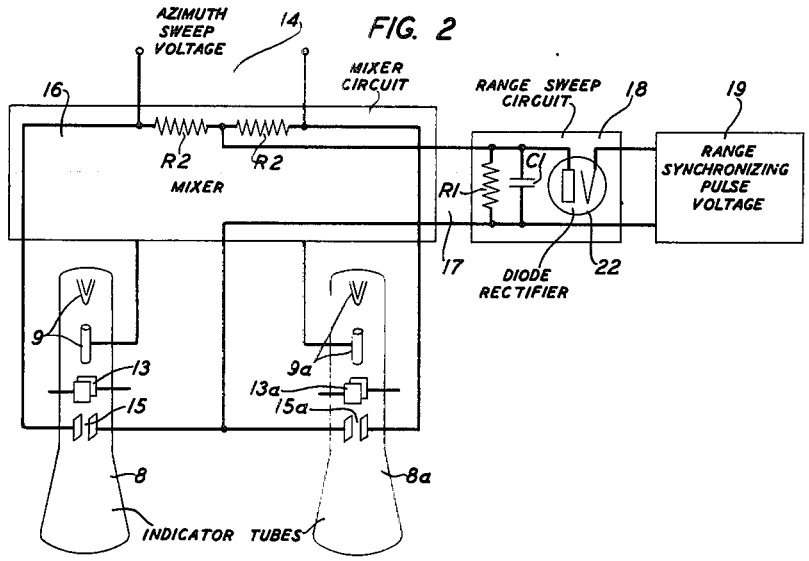
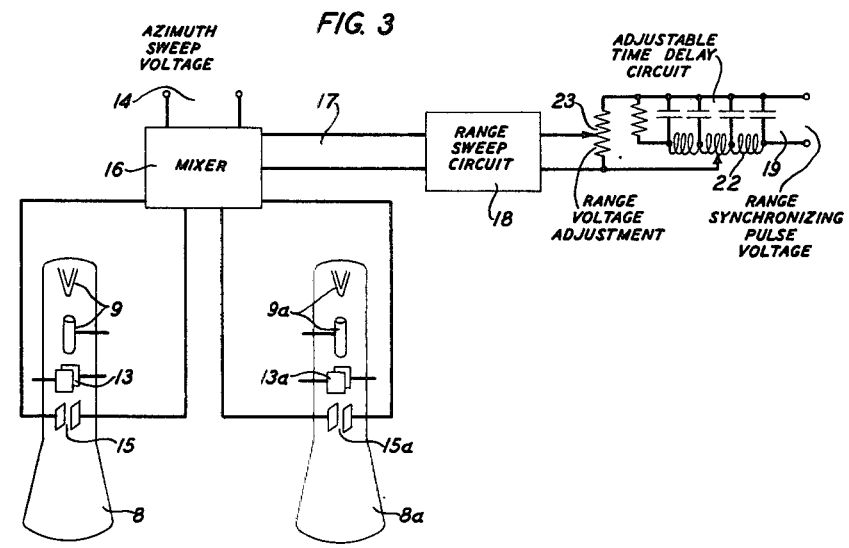
INVENTOR
C. C. CUTLER
BY
ATTORNEY April 28, 1953
C. C. CUTLER
2,637,025
STEREOSCOPIC OBJECT LOCATION SYSTEM
USING RADAR TECHNIQUE
Filed April 1, 1944
3 Sheets-Sheet 3
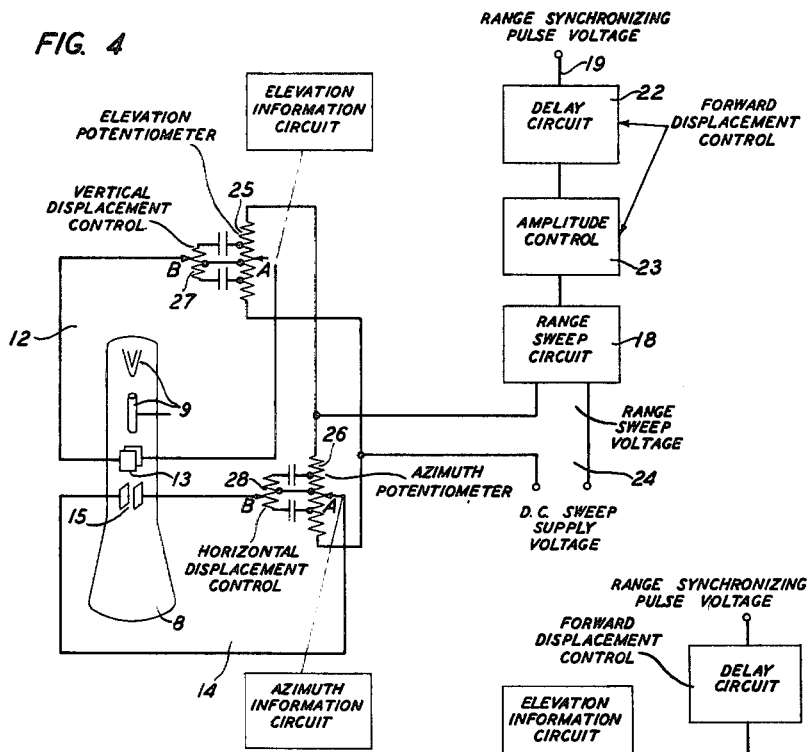
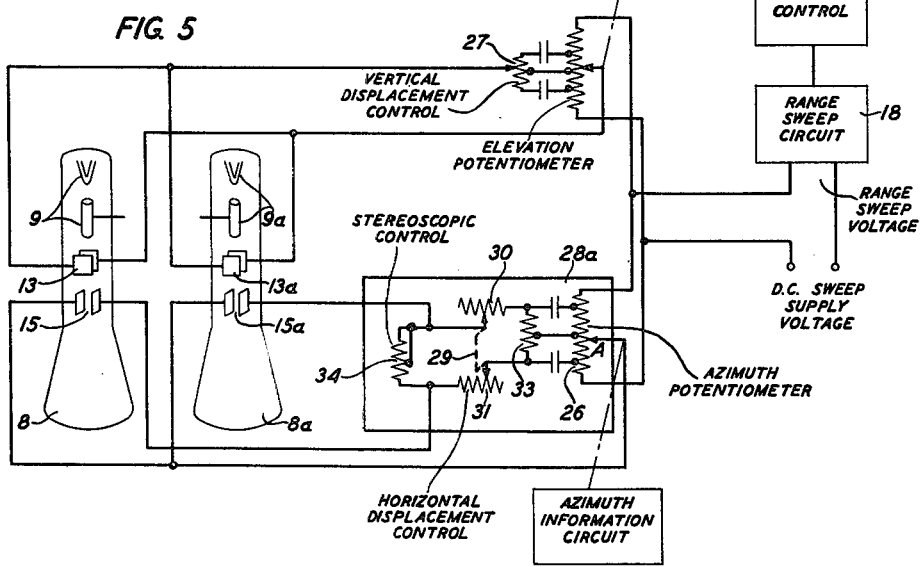
INVENTOR
*C. C. CUTLER*
BY
*Guy T. Morris*
ATTORNEY Patented Apr. 28, 1953

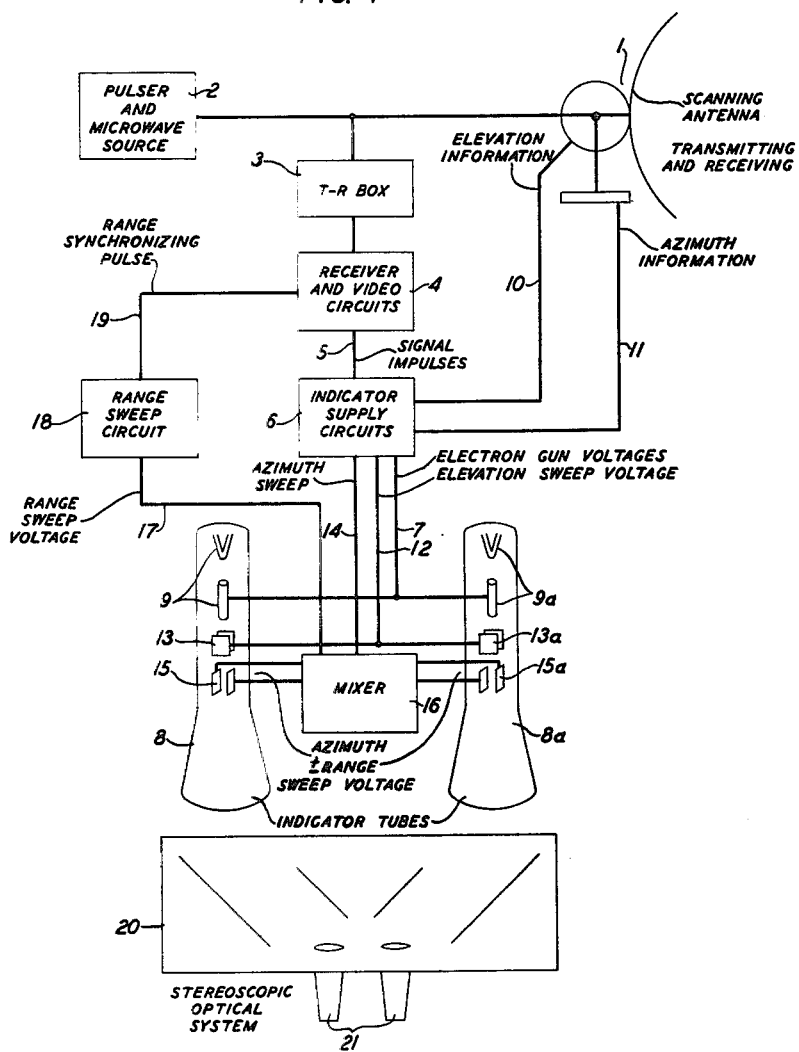

2,637,025

UNITED STATES PATENT OFFICE 2,637,025

STEREOSCOPIC OBJECT LOCATION SYSTEM USING RADAR TECHNIQUE

Cassius C. Cutler, Oakhurst, N. J., assignor to Bell Telephone Laboratories, Incorporated, New York, N. Y., a corporation of New York Application April 1, 1944, Serial No. 529,094

16 Claims. (Cl. 343—11)

This invention relates to a radio system and especially to such a system as conditioned, by the use of the technique heretofore used in a pulse reflector type of object locating system (sometimes called a "radar" system) to achieve a stereoscopic (three-dimensional) representation of a given object.

The invention may therefore be considered, from a slightly different and more specific aspect, as a radio system for representing on a local visual indicator, which might well be a cathode-ray oscilloscope, the planar projection of a given object together with means responsive to the relative distances of radio wave propagation between the local station and discrete portions of said object whereby an illusion of depth may be created in the resultant representation on said visual indicator. The invention would, ideally, achieve a complete stereoscopic representation of a given object by radar technique. The representation would be precisely as if it were viewed by normal stereoscopic, that is, binocular, vision.

Radar systems of the pulse reflector type as designed for object locating, have been known to use, in various combinations, azimuth, elevation and range data, to obtain information as to the given object. The range data makes possible in a certain non-stereoscopic sense the representation of the object in its depth aspect. As in a common type of radar system, the range data could well have great utility without the complete representation of the object in each of its other two dimensions, authough, without more. even the representation in all three dimensions would still not approach that of a stereoscopic system. It is again emphasized that by the technique of the invention the object is completely represented and observed in all three of its dimensions in such manner that, so far as the eyes are concerned, there would be exactly the same reactions as if the object were directly viewed by the eyes by means of visual rays. Of course however, the scope of the invention is such as to enable this representation far beyond the limitations, as to distance and availability generally of the object, of the stereoscopic effect by binocular vision using light rays. Since the azimuth and elevation information would tend to be the same as that otherwise ascertainable by television technique, and since furthermore the resultant two-dimensional representation on a cathode-ray oscilloscope would have the appearance of an ordinary television representation, the system of the invention might be thought of as a stereoscopic radio television system, that is, a system wherein a radio television system has been conditioned so as to induce the true stereoscopic effect in the oscilloscope representation.

Consistently with the above, a principal object of the invention is to obtain a complete stereoscopic representation of a distant given object by radio technique.

As was first pointed out the invention relates to methods of deriving the three-dimensional picture from the azimuth, elevation and range data obtainable from a radar system. The emphasis here is on the fact that the method of the invention is applicable without requiring more information than is available from a pulse radar with a two-dimensional scan. The problem is as how to present the requisite three-dimensional picture with what is essentially a two-dimensional device, namely, a cathode-ray oscilloscope.

A specific object of the invention is to achieve the above result and therefore to achieve three-dimensional representation, that is, true stereoscopic or binocular representation, of a given object without requiring more information than is available from a pulse type radar with two-dimensional scan.

The invention achieves this result to a pre-eminent degree. The only equipment needed beyond what is normally available in the radar system is an additional cathode-ray oscilloscope tube with sweep circuits and some simple optical equipment. No change in the radio scanning means, or in the high frequency circuit generally, is necessary. The system of the invention may therefore be used concommitantly with the use of that large portion of it which is common also to radar systems generally, for specific radar functions not relating to stereoscopic representation and the next above object may be alternatively stated as relating to the evolving of a stereoscopic radar system in which this result is possible of achievement.

Further objects of the invention, each to be matched by the disclosure of a practical embodiment, are:

(1) To suggest a stereoscopic radar system within the frame of the above specifications which shall have the maximum of flexibility and versatility joined with simplicity and, specifically, with this in view, (2) to suggest such a system which is exempt from the limitations present even in light ray visual systems, to the extent that the stereoscopic effect as measured by apparent depth, which in visual light ray systems is a function of the spacing of the eyes, may in the inventive system be regulated at will and even exaggerated for specific purposes, and (3) that the different kind of stereoscopic effect which is promoted by a proper selection of the apparent viewpoint, may also be regulated at will by any desired change of viewpoint.

As a byproduct of the invention, it is possible by the teachings of the invention to sacrifice the advantages of stereoscopic representation to obtain some of the advantages contemplated by the next above object so that, for instance, a non-stereoscopic representation of a given object may be obtained from any desired viewpoint, that is, either in the axis including the object and local receiver where the displacement of viewpoint would be a matter of desired distance from the object, or in a position displaced from said axis, so as to enable a view of the object from a particular vantage point. Of course, in the variants of the stereoscopic system contemplated by the next above objects, this same versatility of viewpoint displacement is illustrated.

Visual perception of depth, which is illustrated here by the stereoscopic effect of binocular vision, has other illustrations. For instance (all the time without distinction as between systems employing only light rays and those employing radio pulses or beams) assistance may be had from the use of (1) contrast of objects against background; (2) perspective; and (3) eye-focussing. Of these alternatives, those numbered (1) and (2) are merely psychological while that numbered (3) is of little value. The stereoscopic effect of binocular vision is the only effect that is capable of definite measurement or comparison. This stereoscopic effect of binocular vision is caused by a horizontal displacement of the images of nearby objects with respect to distant objects, for the two points of view corresponding to the eyes. There is this limitation as to the horizontal direction of the displacement as distinguished from vertical direction, or both because, finally, the viewing is done by the eyes.

This horizontal, or lateral, displacement of the image or representation may be obtained in radar presentation by using two oscilloscopes with what is commonly known as the "type C" scan (elevation versus azimuth) on each, with a range scan or sweep superposed on the azimuth scan or sweep. The range voltage, that is the voltage determining the range indication, should be polarized so as to draw the image of nearby objects on the left-hand tube to the right, and the image on the right-hand tube to the left, as compared with the images of distant objects. This incidentally is precisely what is accomplished by the use of two eyes, as distinguished from one, laterally displaced with reference to the object viewed by the light rays. Then if the two oscilloscope images are viewed through an ordinary stereoscopic lens system, the images can be made to superpose into a picture having depth and which, with a critical adjustment of all adjustable features, can be made identical with the result of ordinary eye vision, although of course the system of the invention would have its greatest applicability where, because of limitations of distance and the like, direct eye vision could not be alternatively used. Also, as has been stated above, by other adjustments provided by the inherent flexibility of the system of the invention, any desired degree of exaggeration of effect or apparent change of viewpoint may be secured.

A system, to give the requisite lateral displacement, could easily be imagined in which said displacement is secured by the use of a duplicate pair of antenna scanning devices each connected to an individual oscilloscope tube. Such a system, which is old in the art, would perhaps correspond to the stereoscopic representation in normal vision more closely, than the system of the invention in which a like effect is simulated. However, it would be subject to obvious inherent limitations. For instance, if the local receiver were on an airplane it would be difficult to obtain adequate lateral displacement of the two viewing antennas. Furthermore, such a system would not have the advantages of applicant's inventive system to the extent that it would require very much more elaborate plant and, specifically, it could not be superposed on an existing radar system with all of the advantages thereto pertaining nor would it admit of adjustment to achieve subnormal effects as in applicant's system as so far described.

Applicant's simulated method of obtaining this horizontal limit of displacement will now be briefly described. To begin with we may assume as the prototype portion of the system the complete equipment for a non-stereoscopic representation, as by strictly television technique, of the given object. That is, there would be from its operation two identical representations on the respective oscilloscopes. By means of the invention these representations are to be eventually deformed so that when viewed simultaneously through an optical device, which might be the conventional, and now traditional, parlor stereoscope, there would be the illusion of depth that makes the representation stereoscopic. Accordingly, there is the usual scanning antenna at either the transmitter, receiver, or both, and a synchronously driven means for causing a like movement of the cathode-rays of the respective oscilloscopes. The images are impressed on the oscilloscopes by intensity modulation of the cathode-rays by use of control grids. The pulse method is assumed since it is most commonly and most favorably used in radar systems. For each transmitted pulse one or more pulses would affect the control grid potential of each oscilloscope and cause a spot or series of spots to occur on the oscilloscope screen corresponding to what the scanning antenna would "see" at the instant in question. The two oscilloscopes operate identically.

As so far described the picture or image would be the same for the two oscilloscopes and precisely like a television picture. To achieve the stereoscopic effect range data from the usual radar equipment assumed could be used in connection with the horizontal sweep to distort the picture otherwise obtained. This range data, which is believed to be obtained in a novel manner in this invention, is obtained from pulses originating at the local station (comprising the pulse transmitter, pulse receiver and oscilloscopes, with associated circuit elements) to impress a bias on the horizontal sweep electrodes of the respective oscilloscopes. This is done in a push-pull manner so that when the horizontal sweep for one oscilloscope is retarded the horizontal sweep for the other oscilloscope is simultaneously accelerated, and therefore so that when the two oscilloscope images are viewed from a point between them they are affected in the manner characteristic of ordinary stereoscopy.

Specifically these stereoscopic pulses, which of course are transmitted locally in synchronism with like pulses transmitted to and eventually reflected from the given object, are used after rectification to charge a capacitor which is shunted by a resistance. The resistance is arranged so that the potential thereacross affects the bias of the two oscilloscopes. The resulting RC circuit has a time constant such that the potential across the resistance, hence the bias, is a function of the time elapsed after the pulse charges the capacitor. Since the velocity of wave propagation, and therefore the velocity of the pulse which is reflected from the object, is constant, this time constant should, ideally, be an inverse linear, that is a hyperbolic, function of time.

For objects which are remote or for portions of a given object correspondingly so remote, as indicating an extreme depth, there should be no stereoscopic effect, since the two eyes in natural vision cannot distinguish the difference in appearance of remote objects. This effect is carried out in the invention since when pulses are returned from a remote object, such a time has elapsed that there has been a complete decay of the potential across the resistance, so that there is no bias and hence no distortion of the images. However, for an object, or portion of an object, relatively close, the reflected pulses would be incident on the oscilloscope very quickly. At that time they would find the horizontal sweeps conditioned by the largest potential across the resistance, which means that by the time these reflected pulses are impressed on the oscilloscope screens the horizontal sweeps are affected to the maximum extent. The result, by proper polarization as above, is that there is a foreshortening in each image, exactly as in the stereoscopic effect in natural vision.

The variances from the above, to enable adjustments to give an appearance of change in depth of a kind that would be simulated by a change of spacing of the eyes in natural vision, and somewhat similar adjustments, using in some instances only one oscilloscope, to change the appearance viewpoint, would require too much space for explanation at this point. However the result is a function of the electrical conditioning of voltage-determining circuits which affect the cathode-rays in a manner somewhat similar to the operation as above but in such a way as to achieve specific effects desired.

Other objects and features of the invention will become apparent from the following detailed description, when taken in connection with the accompanying drawings, in which:

Fig. 1 illustrates diagrammatically and in its most comprehensive form a stereoscopic radar system of the invention;

Fig. 2 illustrates, in one specific form, the necessary details of the "mixer" of Fig. 1 and its immediately associated circuits and structure, for generating and applying the stereoscopic range sweep whereby the horizontal displacements of the images of the respective oscilloscopes are achieved;

Fig. 3 illustrates a variant of the Fig. 2 circuit, providing for special adjustments as to apparent depth and viewpoint;

Fig. 4 illustrates a single oscilloscope embodiment of the circuit of Fig. 3 with means in addition thereto for displacing the viewpoint, that is, the apparent point of observation, either vertically or horizontally to any desired degree; and Fig. 5 illustrates an embodiment like that of Fig. 4 but using two oscilloscopes with the necessary added circuits for providing stereoscopic distortion as in Figs. 2 and 3, so that the figure may alternatively be thought of as illustrating a system like that of Fig. 3 providing additional means for displacing at will the apparent point of observation.

With reference to the system disclosed in Fig. 1 it must be remembered, from the statement of invention, that although the invention involves a system as comprehensive as here disclosed, the essentially novel features whereby the system as a whole becomes distinctive in function and therefore patentably novel reside in only a part of the system, namely, that concerned with the impression of the range sweep voltage for stereoscopically distorting the two images. For this reason and therefore in order to avoid confusion the system showing is diagrammatic, the subsequently numbered figures illustrating in detail the essentially novel circuit features. The circuit elements and features, shown only diagrammatically and only in Fig. 1, are all old in the art and are believed to be adequately taught by the diagrammatic showing when taken with the specification context. Also it is true with respect to the Fig. 1 disclosure, and to a somewhat less degree with respect to the Figs. 2 to 5 disclosures, that the statement of invention has been so detailed and complete as to obviate any necessity of a treatment in connection with the following detailed description except to point out the particular circuits and structures which are required by the description in said statement of invention to carry out its teachings.

It is evident that much of the system of the invention is common to that of the well-known patent to Lyman 2,231,929, February 18, 1941. Lyman has a circuit which, if considerably more elaborated, could be evolved into a stereoscopic system in which the stereoscopic effect is achieved by the use of spaced antennas, corresponding to the eyes in natural vision, as distinguished from the simulated stereoscopic principle of the present invention, and possessing the inherent limitations as compared with applicant's system that have been pointed out. The single oscilloscope tube of Lyman functions like each tube of applicant's Fig. 1, and likewise with the operating circuits intermediate each of applicant's tubes and his antenna, except, of course, for the features specific to the operation of the stereoscopic principle. The Lyman antenna system illustrates a specific form that could have been used by applicant to provide for a coincidental vertical and azimuth scanning, whether by the use of separate antennas for the two scanning functions as in Lyman's Fig. 1 or a single antenna as in his Fig. 4. It is true, however, that applicant prefers, thereby differing from the Lyman disclosure, to use the same antenna, or antenna system, for both transmitting and receiving, this also in common with other prior art. Applicant's own invention disclosed in his U. S. Patent 2,422,184, granted June 17, 1947, either of Figs. 3 or 7, illustrates this. Another instance is the patent to King 2,575,058, granted November 13, 1951. In present Fig. 1, as in the other figures, functional labeling has been used liberally to assist in the automatic disclosure of the invention by the drawing.

In Fig. 1 the transmitting and receiving antenna organization just described is indicated by reference numeral 1. Obviously, and as above indicated, there may be a great versatility of choice as to the unit antennas in that their functions may be individualized and that they may not necessarily achieve their directivity by the parabolic reflector idea as suggested by the drawing. It is also obvious, of course, that so far as the scanning is concerned, it could be achieved by either an effectively movable transmitting or receiving antenna if separate, or both could be movable as is here indicated for the structure common to both functions. The above King patent shows a like scanning function. The wave to be eventually transmitted and later received, after reflection, both by antenna organization 1, is generated and conditioned so as to be given its pulse characteristic by pulser and microwave source 2. The pulse system is used as most efficiently adaptable to eventual reproduction on the oscilloscope screens to represent the object scanned, from which the waves are reflected. Other systems have been used and, to the extent that they are capable of reproducing the desired object on the oscilloscopes, could be used in the present system. The stereoscopic technique is not a function of the wave characteristic. The T-R box 3 represents a standard, and conventional, circuit known by that name, providing a common path for a desired amount of transmitted and received energy with provision for disabling either function by prior incidence thereon of waves corresponding to the alternative function. In the present circuit received energy from antenna 1 passes through this element 3 to the receiver and video circuit 4 where it is conditioned to present the eventual product to circuit 5 as reflected signal impulses.

These signal impulses are eventually supplied by circuit 7 to the amplitude modulating portions of oscilloscope, or indicator, tubes 8 and 8a. Since this modulating means would customarily require operation on a control electrode or the like, in turn requiring a supply potential, the circuits of the tubes of the signal impulses are shown as going through the block 9 used in common to indicate the supply circuits, for various purposes, of the system. The circuit 7 for these signal impulses is shown as going to electron guns 9 and 9a in the respective tubes. These electron guns may conform with conventional practice and would usually comprise a cathode and a controlling electrode together with various accelerating and forming electrodes. The above Lyman patent illustrates one specific means that might be used.

Of course it is necessary for the cathode-ray beams of the two tubes to scan their fields synchronously with the scanning of the desired object by the scanning antenna system, in order to reproduce said distant object with fidelity by assuring that the amplitude modulation effected in the electron guns and which presumes to indicate a spot, or spots, on the oscillograph picture corresponding to corresponding parts of the distant object, do adequately represent said object. This function is effectuated by the diagrammatically shown circuits 10 and 11 for elevation information and azimuth information respectively. The former information is impressed on the elevation or vertical deflecting plates 13 and 13a of the respective tubes by circuit 12. The latter, that is the azimuth, information, is eventually impressed through azimuth sweep circuit 14 on azimuth or horizontal deflecting electrodes 15 and 15a of the respective tubes. The elevation and azimuth information circuits are shown passing through the block 6 because they, like the signal impulse circuit, must be conditioned by biasing potentials or the like, requiring supply circuits. The signal impulse circuit 7 and the elevation sweep circuit 12 are both shown as connected to the tubes in parallel. As a matter of fact, as long as they are impressed equally and symmetrically on the two tubes, it is immaterial as to whether they are impressed serially or in parallel. The azimuth information, that is, azimuth sweep voltage, circuit 14 is shown as passing through the mixer 16 on its way to the azimuth deflecting electrodes of the tubes. This is because a particular relationship, to be later described, is necessary with respect to this sweep voltage, especially relatively to the range sweep voltages. From these range sweep voltages there is eventually achieved the distorting biases which ultimately cause the relative displacements in the pictures or presentations on the respective oscilloscopes which marks the stereoscopic effect. The essentially novel feature of the invention inheres in the relationship between this mixer 16, that is, the circuits comprised therein, and the indicator tubes and their elements.

The just referred to range sweep voltage is incident on the mixer 16, and thence on the azimuth sweep electrodes of the tubes, from circuit 17 after conditioning in range sweep circuit 18. This range sweep voltage, as shown in Fig. 1, is derived through circuit 19 from the block 4 circuit which is connected with the T-R box 3. This is in deference to the practical situation which permits a sufficient amount of the pulse waves to flow from source 2 through the T-R box and the receiver and video circuits to the circuit 19. This range sweep voltage could equally as well, except possibly for practical reasons, be derived directly from source 2. The label "range synchronizing pulse" is shown applied to this circuit 19 because, of course, these range pulses must be synchronized with the transmitted pulses. The detailed function of this circuit 19 will be explained in connection with Fig. 2.

As so far shown, momentarily leaving out of consideration the range sweep voltage, there has been shown a means for reproducing like representations or images on the two oscilloscopes, each corresponding precisely in configuration with the distant object, since the cathode-rays are moved synchronously with the scanning antenna and is "printed" on the oscilloscope screen by operation of the signal impulses on the electron guns only when the scanning radio beam intercepts the object. By the means to be described in connection with the remaining figures, the range sweep voltage relatively distorts the two representations to induce the stereoscopic effect.

In order to eventually obtain a visual realization of this effect, the intervention of an optical device corresponding to what was once called a "parlor stereoscope" is necessary. This is the element 20 of Fig. 1. The two relatively distorted images in the oscilloscope tubes 8 and 8a correspond to the visual image received by each eye individually in natural vision. However, to insure that each said image is viewed individually and by a single eye and therefore to carry out the correspondence with natural stereoscopic vision to the ultimate limit, this stereoscope is necessary. Thereby the observer's eyes, which are applied to appendages 21 of the stereoscope, are individualized with respect to the images and said images can be made to superpose into a picture having depth and therefore exhibiting the stereoscopic effect. The diagrammatic showing of the stereoscope 20 suggests, by the use of the diagonal elements representing mirrors, that the spacing of the observer's eyes can be accommodated to a greater spacing of the oscilloscope tubes, which obviates a difficulty having to do with essential space requirements for the oscilloscopes and associated structures.

Fig. 2 illustrates in full detail one circuit embodiment of the means for generating and applying the stereoscopic-range sweep such as is shown diagrammatically in Fig. 1. Therein similar elements are similarly labeled. The range sweep potential is initiated by a pulse from circuit 19 which has been synchronized with the outgoing radar pulse and which must be shaped by a network before being applied to the indicator tubes. To this end the initiating pulse charges condenser $C_1$ through a diode, or the like, rectifier 22. The condenser then discharges exponentially through the resistor $R_1$ and the voltage across resistor $R_1$ is connected through resistors $R_2$ to the horizontal deflecting, that is, azimuth, oscilloscope electrodes. The voltages applied in this way to the respective pairs of deflecting electrodes are applied in parallel thereto but with relatively reverse polarity. The azimuth sweep voltage is applied, as shown, to the same pairs of electrodes in a serial manner. Accordingly, the azmiuth sweep voltage is applied symmetrically to the tubes whereas the conditioned azimuth range sweep voltage is applied in a push-pull manner. Specifically, it is applied, in the arrangement shown, so as to tend to draw to the right, by bias, the cathode-ray of one tube and to correspondingly move the cathode-ray of the other tube to the left. The eventual effect is a tendency to draw the images of nearby objects closer together, and correspondingly of images of parts of the same object. This is the stereoscopic effect of binocular vision as pointed out in the statement of invention. It is the function of the network constituted by resistor $R_1$ and condenser $C_1$ to perform this function quantitatively so as to achieve the desired effect in such a way that the illusion of depth simulates, with respect to the optical nerve of the eye, the effect of stereoscopic vision as achieved by the eyes in natural vision.

The network shown gives an exponential decay range sweep voltage which is close enough to the ideal hyperbolic decay, meaning that the voltage across resistance $R_1$ should ideally be an inverse linear function of the time within which the prior decay has occurred. A more complex circuit could easily be designed, within the teachings of the prior art, which would give a closer approximation and therefore a closer stereoscopic picture, although practical necessity would not urge or justify such complexity.

For objects which are very remote or for portions of an object correspondingly so remote, as indicating an extreme depth, there should be no stereoscopic effect, since the two eyes in natural vision cannot distinguish the difference in appearance of objects so extremely remote. This idea is carried out by the expedient of the invention since when pulses return from a very remote object or portion of an object, such a time has elapsed that there has been a complete decay of the voltage across resistor $R_1$ by the time that the reflected pulses have registered their effects on the oscilloscope screen as a portion of the images. Accordingly, there has been no bias and hence no distortion of the representation. However, for an object or portion of an object, very close, the reflex pulses would be incident on the oscilloscopes very quickly. At that time they would find the range sweep voltage conditioned so as to be a maximum, which means that at the time these reflected pulses are registered on the oscilloscope screens, the horizontal sweeps of the cathode rays are relatively affected to the maximum extent. The resultant representation is exactly as the stereoscopic effect in natural vision. A true hyperbolic decay characteristic would ideally be required since the velocity of pulse transmission before and after reflection is constant. Although this description is in terms of simulation of stereoscopic effect and illusion of depth, there is such an illusion that the two eyes in viewing the two oscilloscopes exactly as in the ordinary parlor stereoscope, or in natural vision, could not detect the error. The degree of the effects may be made correct very easily by adjustment of the potential in the circuit 19 which impresses these stereoscopic pulses on the rectifier and the network. This, of course, may be done by a potentiometer-like means (not shown).

The invention has now been described in its basic aspects. As so described reliance is had solely on binocular vision to create the stereoscopic determination of depth. Near the beginning of this specification a listing was given of various expedients besides that of binocular vision for this visual perception of depth. It was stated that this perception by the stereoscopic effect of binocular means was the most effective. This is true but it is also true that help may be secured by the use of one or more of the other expedients. For example, some perspective may be added or a sharp contrast between the object of interest and the background (preferably overlapping) may be included in the picture. These expedients, which are on the psychological order, may be practiced in quite obvious ways in connection with the practice of the invention as above described, just as they may be used in natural vision. Accordingly, the disclosure will not be cumbered by a specific treatment of them.

The stereoscopic effect by itself does not give an actual measurement of depth without a means of comparison. The illusion of depth obtained with this invention may be extended to make possible actual measurement of depth by providing an artificial range scale of some kind against which the position of the object is compared. This could be accomplished by marking a comparison scale on the oscilloscope screen or by introducing artificial impulses to the system at a predetermined time interval after the initial pulse to simulate a target at a distance corresponding to the accurately determined time intervals. Such range markers are in common use in radar systems and may be obtained from impulse type oscillators initiated by or synchronized with the initial transmitted radar pulse.

It would not require too great a stretch of imagination to say that the eyes, by stereoscopic device 20, view the two oscilloscopic representations stereoscopically exactly as they alternatively might view the scene itself, the remaining apparatus serving only to bring otherwise inaccessible objects to a position to make effective the ordinary incidents of stereoscopic vision. This of course means that the range sweep voltages should be impressed on what would ordinarily be thought of as the horizontal deflecting electrodes, as electrodes 15 and 15a in Fig. 1. It is because of the interposition of the eyes in this final step that the stereoscopic presentation of radar data provide a more effective means for gaining a perception of depth than alternative means. Incidentally, the stereoscopic method of presentation is capable of nearly as great accuracy of observation as the radar angle and range resolution will allow, so that the advantages accruing from the stereoscopic technique do not involve any appreciable attendant sacrifice.

Fig. 3 is a duplicate, as to the elements similarly numbered, of Figs. 1 and 2. In fact the only new features disclosed in it are those numbered 22 and 23, having to do with adjustments to increase the flexibility, and therefore the utility, of the systems of Figs. 1 and 2. These elements will be described below. However, it should be noted that although, as above, similarly numbered elements are duplicates of those of Figs. 1 and 2, there have been slight changes in drafting convention so that there is not a line-for-line correspondence. For example, in some instances in Fig. 3 a double line has been shown to indicate a certain circuit whereas in the more diagrammatic showing of Figs. 1 and 2 a single line is used.

Element 22 is a time-delay circuit which therefore delays the incidence of the range sweep voltages on the azimuth deflecting pairs of electrodes. Accordingly, it would determine the time of initiation of the range sweep and consequently the position of the stereoscopic point of view along the axis connecting the center of the radar antenna and the distant object. By obvious means to give an effect opposite to that of a delay the apparent point of view could be positioned behind the radar instead of between it and the object. This delay circuit or the equivalent would allow the operator to emphasize the range displacement at any position in space and thus increase the accuracy of range comparison.

Element 23 is a potentiometer-like means for adjusting the amplitude of the range sweep voltage. This changes the apparent depth of the picture presented. With low sweep voltage all objects appear distant while with large sweep voltage the relative depth is emphasized. Of course, range accuracy is greatest under the latter condition. This adjustment corresponds to changing the separation of the points of observation and therefore would be like changing the spacing of the eyes in natural vision. Since this apparent separation is by the use of electrical, rather than mechanical, expedients it can be greatly emphasized, even to the extent of having the apparent points of observation separated by a space much greater than that actually occupied by the radar.

Although both of these adjustments trend in same direction, there are fundamental differences in their effects. The former is as though the observer were to move up close to the objects of interest, thereby concentrating his attention thereon, for a better comparison of range position with respect to some neighboring object, or an artificial range scale. In so doing, nearby objects are lost, and very distant objects are relatively unaffected. Also since only the azimuth presentation is altered the picture is considerably distorted, being compressed in elevation as compared to azimuth.

On the contrary, the latter adjustment, whereby there is a changing of the apparent depth, does not distort the picture as regards the relative positions of objects in the field of view, but simply emphasizes the depth of the view. For general observation this control would be most desirable, but in a case where accurate range comparison on a particular point is desired, without interest in the remainder of the picture, the former would be useful. Normally the range sweep voltage control would be set to the point where it was just possible to observe the nearest object of interest without eyestrain.

Fig. 4 illustrates a variant form of the invention exhibiting all of the features of the circuits of the preceding figures with additional disclosure directed to features making for even greater flexibility. Because these added features are not limited to a system exhibiting stereoscopic effects the alternative using a single oscilloscope is shown for simplicity.

The similarly numbered elements may be identically the same as in Fig. 3, for example. The elements specific to the single oscilloscope assumed are labeled the same as for one of the oscilloscopes in Fig. 3. For simplicity the two scanning sweep circuits are combined as to their supply potential, which is shown as coming from direct current sweep supply voltage circuit 24. To this end the scanning circuits 12 and 14 (of course shown by the same numerals in Fig. 1) are here shown connected to this common supply circuit with the necessary electrical adjuncts to make the circuit electrically complete. That is, said circuits 12 and 14 are connected respectively to potentiometers or the like 25 and 26 which are connected across this common supply circuit and the scanning potentials result from the physical movement of the contactors of these circuits 12 and 14 on said potentiometers at points A. These contactors are connected, as diagrammatically, shown to the elevation information, and azimuth information, circuits which means, when read with Fig. 1 and the specification context, that these contactors are moved synchronously with the "spinner" of the scanning antenna organization to insure that there is a scanning, both vertically and horizontally, in consonance with the scanning of the distant object, so that eventually and of course with the help of the amplitude modulating means associated with the electron gun 9, there will be an oscilloscope representation identically like said object. Thus with zero range sweep voltage the operation of the circuit is exactly that of the conventional radar with type "C" scan. The essentially novel features of the Figure 4 circuit have to do with the superposition of the controlled range sweep voltage on the ordinary azimuth and elevation sweeps. Consider first the effect of a symmetrical application of the range sweep voltage to the azimuth and elevation sweeps, as would be obtained with the taps "B" connected to the centers respectively of potentiometers 27 and 28.

The range sweep voltage has been affected by elements 22, 23 and 19 as before described, so that it is suitably adjusted in time delay, and amplitude, and is shaped to approximate a hyperbolic decay characteristic as was previously discussed in connection with Fig. 2. Now, the effect of applying the range sweep voltage in this fashion to the usual angular sweeps, is to draw the images of nearby objects apart, away from the center of the screen. That is, considering the position of tap "A" on the azimuth sweep potentiometer 26 to be in a position to indicate an object to the right of straight ahead of the radar, the range sweep voltage would make the indication of such an object even further to the right. Similarly objects to the left of straight ahead would appear even further to the left, and similarly nearby objects would appear spread further in elevation. Distant objects would be relatively unaffected because by the time the signal impulses from them had returned to the radar, the range sweep voltage would have decayed to a very small value. By itself, this would result in a considerable distorted picture, but when the applied range sweep voltage is delayed by element 22 from the initial pulse by an appropriate amount in cooperation with an adjustment of the range sweep voltage amplitude as determined by element 23, the images of objects in the field of the radar again assume their proper respective relationship, but as would be seen if they were observed from a point in space in front of the radar. This therefore, is a true method of projecting the effective radar observation position into space in front of the radar.

In order to facilitate the operation of the circuit as above for observation displacement, it is desirable to synchronize the delay circuit control and the range sweep amplitude control, so that the displacement effect could be obtained with one manual operation.

The time delay introduced in the delay circuit (22) should be twice the difference in distance of the object from the actual site of the observer and the apparent point of observation divided by the velocity of propagation. To give a precise picture, this would require changing the delay with the azimuth and elevation sweeps, although for some uses a close enough approximation to the ideal would be achieved by introducing a delay equal to twice the distance from the site of the observer to the apparent point of observation divided by the velocity of propagation.

The forward displacement control above differs from that discussed in connection with Fig. 3 since, in the circuit of Fig. 4, the correct relative positions of the images are maintained whereas in the former case the presentation was distorted.

The resistance-capacitance networks 27 and 28 serve to give a lateral displacement of apparent observation position, in addition to the forward displacement previously described. As before discussed the effect of the range sweep voltage is to spread apart the images of nearby objects, spreading away from the center. The effect of moving taps "B" on potentiometers 27 and 28 is to alter the position on the screen from which such images are spread. In addition to the range sweep voltage applied to one electrode of each pair through tap "A" on potentiometer 25 or 26 range sweep voltage is applied to the relatively opposite electrodes through tap "B" on potentiometers 27 and 28. The time constants of the resistance-capacitance networks associated with these potentiometers 27 and 28 are long compared to the frequency of the range sweep, so that a component of the range sweep voltage appears across the potentiometers 27 and 28 while the voltage from the direct current sweep supply is blocked. The result of this on the screen is to displace the images in a similar fashion to the way they would be displaced by moving the radar to a position of observation laterally displaced as well as for displaced forward from the real position of observation. The result of the combined circuit of Fig. 4 is to permit moving the apparent position of observation at will in front of the radar.

It is realized that the forward displacement alone together with pointing of the radar antenna would give the same flexibility of the apparent point of view, but in that case the central line of sight would always be parallel to a line connecting the radar with the projected apparent point of observation. The method of Fig. 4 is not so limited, but permits in addition a freedom of choice of the direction that the radar shall look from the removed apparent position of observation.

It is now evident that by means of the Fig. 4 circuit when read with the earlier numbered figures a facsimile representation of a distant object may be achieved on the oscilloscope with means for adjusting the apparent viewpoint in an axial direction by each of the two expedients by which the Fig. 3 circuit is distinguished and, in addition, for a further horizontal or vertical displacement of viewpoint or any desired combination of the two, so that eventually any desired apparent viewpoint in space may be achieved. The use of this circuit, without the superposed stereoscopic effect which will be explained in connection with the next figure, has certain specific advantages in practical operation. For instance, objects which lie at the same azimuth and elevation, but at different ranges could be separated.

Fig. 5 illustrates the system of Fig. 4 modified to include the stereoscopic principle of operation. Because this circuit is precisely the same as that of Fig. 4 except for the addition of the second oscilloscope and, with it, the special circuit features on account of which the stereoscopic scan is achieved, this figure is without labeling except the functional labeling of the parts and the labeling for the elements immediately pertaining to the oscilloscopes.

The two oscilloscopes are connected in parallel except for the horizontal sweep electrodes, and the circuit of Fig. 5 is identical to Fig. 4 except for a modification of network 26, 28 into the more highly elaborated network 28a of Fig. 5 to achieve the stereoscopic effect. This circuit is designed to give horizontal observation displacement and the purpose of said network 28a, and especially of element 34 contained in it is to make the horizontal displacement of the two images different as the two tubes, such that this difference would result in the sensation of depth when observed with a stereoscope.

Suppose first that rheostat 34 is turned to zero resistance so that the horizontal sweep electrodes are connected in parallel. Then the circuit functions identically with Fig. 4 and the explanation of that figure applies identically to Fig. 5. The ganged rheostats 30 and 31 combine to function exactly as the potentiometer in network 28 of Fig. 4 and wavable tap functions exactly as the similarly identified tap in Fig. 4. Center-tapped resistor 33 simply provides a direct current path for the azimuth voltage to the oscilloscope plates.

The voltage drop in rheostat 34, when it is introduced into the circuit, causes a difference in the horizontal displacement voltage applied to the oscilloscope tubes, so that the average voltage is the same as before, but one tube has greater and the other less displacement voltage than before. The range sweep voltage should be polarized so as to draw the image of nearby objects on each of the tubes, toward the opposite tube, from the average position. Thus the images obtained will differ so that when viewed with a stereoscopic optical system, an illusion of depth will be obtained.

It is realized that in Fig. 4 and Fig. 5, the range sweep voltage could be applied separately from the direct current supply voltage and angular sweep potentiometers, so that the horizontal and vertical displacement and stereoscopic effects could be obtained without necessitating forward displacement at the same time. Also it is realized that there is a multiplicity of possible circuits that would apply the necessary voltages to the oscilloscope tubes to produce the stereoscopic and displacement effects, and the attached circuits serve only as an example of how this may be accomplished.

Although the invention has been described in considerable detail, it is to be understood that such description is illustrative rather than limiting, as the invention may be variously embodied otherwise than is shown and is to be interpreted only as claimed.

What is claimed is:

1. A radio system comprising a pulse wave source, a transmitting and receiving antenna organization embodying means for two-dimensional scanning of desired objects by the waves transmitted to said object and reflected therefrom back to said antenna organization, a cathode-ray oscilloscope including deflecting means adapted on energization to laterally deflect the cathode beam in relatively normal directions, scanning means for said oscilloscope acting on said deflecting means, means whereby said oscilloscope scanning is synchronous with the scanning of the distant objects, and means responsive to the received reflected pulses for amplitude modulating the cathode-ray of said oscilloscope, all whereby the visual field of the oscilloscope has impressed thereon a facsimile representation in two dimensions of the distant objects, together with means electrically conditioning the potentials on said oscilloscope deflecting means, which potentials determine the fidelity of said representation, for changing the apparent viewpoint of the distant objects from the position of the oscilloscope itself, said viewpoint changing means comprising a local circuit for transmitting to the oscilloscope deflecting means after conditioning pulses the duplicates of which are simultaneously transmitted to and reflected from the distant objects, said local circuit comprising means for changing the time of incidence of all of said pulses on the connected elements in the circuit, whereby the apparent viewpoint is correspondingly changed along the axis extending from the distant objects and through the local station which includes the oscilloscope.

2. A radio system comprising a pulse wave source, a transmitting and receiving antenna organization embodying means for two-dimensional scanning of desired objects by the waves transmitted to said object and reflected therefrom back to said antenna organization, a cathode-ray oscilloscope including deflecting means adapted on energization to laterally deflect the cathode beam in relatively normal directions, scanning means for said oscilloscope acting on said deflecting means, means whereby said oscilloscope scanning is synchronous with the scanning of the distant objects, and means responsive to the received reflected pulses for amplitude modulating the cathode-ray of said oscilloscope, all whereby the visual field of the oscilloscope has impressed thereon a facsimile representation in two dimensions of the distant objects, together with means electrically conditioning the potentials on said oscilloscope deflecting means, which potentials determine the fidelity of said representation, for changing the apparent viewpoint of the distant objects from that of the oscilloscope itself, said viewpoint changing means comprising a local circuit for transmitting to the oscilloscope deflecting means, after conditioning, pulses duplicates of which are simultaneously transmitted to and reflected from the distant objects, said local circuit being connected to the cathode-ray deflecting means through the scanning circuits, so as to superpose a biasing potential thereon, the composite circuit, between the scanning means for at least one of the deflecting means and said deflecting means, including a resistance-condenser organization, the condenser being adapted to receive the conditioned pulses and to deliver them through the resistance, as in accordance with the decay-voltage characteristics of the organization, to the deflecting means, whereby the apparent viewpoint may be moved laterally to any desired position.

3. A radio system comprising a pulse wave source, a transmitting and receiving antenna organization embodying means for two-dimensional scanning of desired objects by the waves transmitted to said object and reflected therefrom back to said antenna organization, a cathode-ray oscilloscope including deflecting means adapted on energization to laterally deflect the cathode beam in relatively normal directions, scanning means for said oscilloscope acting on said deflecting means, means whereby said oscilloscope scanning is synchronous with the scanning of the distant objects, and means responsive to the received reflected pulses for amplitude modulating the cathode-ray of said oscilloscope, all whereby the visual field of the oscilloscope has impressed thereon a facsimile representation in two dimensions of the distant objects, together with means electrically conditioning the potentials on said oscilloscope deflecting means, which potentials determine the fidelity of said representation, for changing the apparent viewpoint of the distant objects from that of the oscilloscope itself, said viewpoint changing means comprising a local circuit for transmitting to the oscilloscope deflecting means, after conditioning, pulses duplicates of which are simultaneously transmitted to and reflected from the distant objects, said local circuit being connected to the cathode-ray deflecting means through the scanning circuits, so as to superpose a biasing potential thereon, the composite circuit, between the scanning means for at least one of the deflecting means and said deflecting means including a resistance-condenser organization, the condenser being adapted to receive the conditioned pulses and to deliver them through the resistance, as in accordance with the decay-voltage characteristics of the organization, to the deflecting means, whereby the apparent viewpoint may be moved laterally to any desired position, said local circuit also including, anterior to its connection with the scanning circuit, a means for adjusting the time of incidence of the pulses on the oscilloscope circuits, whereby to achieve an apparent viewpoint displacement along the axis connecting the distant objects with the local station including the oscilloscope, the two viewpoint changing means together making possible a change of apparent viewpoint from the oscilloscope itself to any point in space.

4. A system comprising, at a local radio station, radio wave transmitting and receiving means including a scanning means for given objects, a pair of cathode-ray visual indicating devices, one corresponding to each of the eyes of an observer, means operating synchronously with said scanning means for scanning the visual fields of said indicating devices, means for amplitude modulating the rays of said indicators as in accordance with the reflected waves received from said objects, whereby to impress like representations of said object on said indicators, and time constant means conditioned by the relative difference of time of wave propagation between said local station and the elemental portions of the scanned object for biasing said last-mentioned scanning means so as to differentially distort the representations specific to said indicating devices, said conditioned means comprising a relaxation network, means for impulsing said network by discrete elements of said waves synchronously with the radio transmission of like wave elements, and means for impressing potentials derived from said network, whose values are substantially inversely proportional to the elapsed time since the impulsing of said network and for biasing therewith the cathode-ray scanning beams of said indicating devices to cause a stereoscopic distortion by relative lateral image displacements of said representations, together with an optical stereoscopic viewer for viewing said representations, all whereby to impress on said devices, when viewed by the eyes of an observer, an illusion of depth.

5. A system comprising, at a local radio station, radio wave transmitting and receiving means including a scanning means for given objects, a pair of cathode-ray visual indicating devices, one corresponding to each of the eyes of an observer, means operating synchronously with said scanning means for scanning the visual fields of said indicating devices, means for amplitude modulating the rays of said indicators as in accordance with the reflected waves received from said objects, whereby to impress like representations of said objects on said indicators, and time constant means conditioned by the relative difference of time of wave propagation between said local station and the elemental portions of the scanned object for biasing said last-mentioned scanning means so as to differentially distort the representations specific to said indicating devices, said conditioned means comprising a relaxation network, means for impulsing said network by discrete elements of said wave synchronously with the radio transmission of like wave elements, and means for deriving potentials from said network whose values are substantially inversely proportional to the elapsed time since the impulsing of said network and for relatively biasing therewith the cathode-ray scanning beams of said indicating devices to cause lateral image displacements of the elemental portions of the representations specific to the two devices, an optical stereoscopic viewer for viewing the resultant representations and a means in circuit with said relaxation network for affecting the pulse propagation velocity whereby to vary, as desired, the incidence of said discrete wave elements on said network and accordingly to vary the apparent stereoscopic viewpoint of said object along the axis through the distant objects and indicating devices in said indicating devices, all whereby to impress on said devices, when viewed by the eyes of an observer, an illusion of depth.

6. A system comprising, at a local radio station, radio wave transmitting and receiving means including a scanning means for given objects, a pair of cathode-ray visual indicating devices, one corresponding to each of the eyes of an observer, means operating synchronously with said scanning means for scanning the visual fields of said indicating devices, means for amplitude modulating the rays of said indicators as in accordance with the reflected waves received from said objects, whereby to impress like representations of said objects on said indicators, and time constant means conditioned by the relative difference of time of wave propagation between said local station and the elemental portions of the scanned object for biasing said last-mentioned scanning means so as to differentially distort the representations specific to said indicating devices, said conditioned means comprising a relaxation network, means for impulsing said network by discrete elements of said wave synchronously with the radio transmission or like wave elements, and means for deriving potentials from said network whose values are substantially inversely proportional to the elapsed time since the impulsing of said network and for relatively biasing therewith the cathode-ray scanning beams of said indicating devices to cause lateral image displacements of the elemental portion of the representations specific to the two devices, an optical stereoscopic viewer for viewing the resultant representations, and means in circuit with said relaxation network for adjusting the potential impressed on said network whereby to correspondingly change the apparent depth of stereoscopic vision, all whereby to impress on said devices, when viewed by the eyes of an observer, an illusion of depth.

7. A radio pulse reflector type of object locating system comprising two cathode-ray oscilloscopes, means for generating radio pulses, means for transmitting the same and later receiving said pulses after reflection from distant objects including antenna means for two-dimensional scanning of said objects by the radio beam which embodies said pulses, means operating synchronously with said antenna scanning means for scanning the visual fields of said oscilloscopes, and means for amplitude modulating the oscilloscope beams as in accordance with the received reflected radio pulses, all whereby like facsimile representations of the distant objects are impressed on the visual fields of said oscilloscopes, together with an optical stereoscopic viewer for said representations and time constant means for stereoscopically distorting said representations in a lateral direction as viewed as in accordance with the time-decay characteristic of said time constant means, the distortion being therefore inversely proportional as the spacing between the local station which comprises said oscilloscopes and the distant objects, said means for stereoscopic distortion comprising means for impressing a push-pull bias on the oscilloscope beams in a direction lateral to the direction of stereoscopic viewing by a potential derived from pulses, duplicates of which are simultaneously transmitted to the distant object and which potential has been conditioned by the time-decay characteristic of said time constant means so that its value is substantially inversely proportional to the elapsed time between said transmission and the incidence on the oscilloscopes of said impulses after reflection from the distant object, all whereby to achieve a perception of depth by the stereoscopic effect of binocular vision.

8. A radio pulse reflector type of object locating system comprising two cathode-ray oscilloscopes, means for generating radio pulses, means for transmitting the same and later receiving said pulses after reflection from distant objects including antenna means for two-dimensional scanning of said objects by the radio beam which embodies said pulses, means operating synchronously with said antenna scanning means for scanning the visual fields of said oscilloscopes, and means for amplitude modulating the oscilloscope beams as in accordance with the received reflected radio pulses, all whereby like facsimile representations of the distant objects are impressed on the visual fields of said oscilloscopes, together with an optical stereoscopic viewer for said representations and time constant means for stereoscopically distorting said representations in a lateral direction as viewed as in accordance with the time-decay characteristic of said time constant means, the distortion being therefore inversely proportional as the spacing between the local station which comprises said oscilloscopes and the distant objects, said means for stereoscopic distortion comprising means for deriving from the circuits anterior to the oscilloscopes pulses corresponding to those simultaneously transmitted to the distant object, rectifying means therefore, a condenser in series with said rectifying means, so as to be adapted to be charged by the rectified pulses, a resistance in parallel with said condenser, so that the potential across at least a part of it represents the decaying potential of the charged condenser, and a means for impressing said potential on said oscilloscopes in push-pull relation to achieve said distorting bias, all whereby to achieve a perception of depth by the stereoscopic effect of binocular vision.

9. A radio pulse reflector type of object locating system comprising two cathode-ray oscilloscopes, means for generating radio pulses, means for transmitting the same and later receiving said pulses after reflection from distant objects including antenna means for two-dimensional scanning of said objects by the radio beam which embodies said pulses, means operating synchronously with said antenna scanning means for scanning the visual fields of said oscilloscopes, and means for amplitude modulating the oscilloscope beams as in accordance with the received reflected radio pulses, all whereby like facsimile representations of the distant objects are impressed on the visual fields of said oscilloscopes, together with an optical stereoscopic viewer for said representations and time constant means for stereoscopically distorting said representations in a lateral direction as viewed as in accordance with the time-decay characteristic of said time constant means, the distortion being therefore inversely proportional as the spacing between the local station which comprises said oscilloscopes and the distant objects, said means for stereoscopic distortion comprising means for deriving from the circuits anterior to the oscilloscopes pulses corresponding to those simultaneously transmitted to the distant objects, rectifying means therefore, a condenser in series with said rectifying means so as to be adapted to be charged by the rectified pulses, a resistance in parallel with said condenser, so that the potential across at least a part of it represents the decaying potential of the charged condenser, means for impressing said potential on said oscilloscopes in push-pull relation to achieve said distorting bias, and potentiometer-like means in circuit with said rectifier and resistance-condenser combination for adjusting the resultant impressed potential whereby to increase as desired the illusion of depth analogously as by correspondingly changing the lateral spacing of the effective viewpoints corresponding to the respective distorted representations, all whereby to achieve a perception of depth by the stereoscopic effect of binocular vision.

10. A radio pulse reflector type of object locating system comprising two cathode-ray oscilloscopes, means for generating radio pulses, means for transmitting the same and later receiving said pulses after reflection from distant objects including antenna means for two-dimensional scanning of said objects by the radio beam which embodies said pulses, means operating synchronously with said antenna scanning means for scanning the visual fields of said oscilloscopes, and means for amplitude modulating the oscilloscope beams as in accordance with the received reflected radio pulses, all whereby like facsimile representations of the distant objects are impressed on the visual fields of said oscilloscopes, together with an optical stereoscopic viewer for said representations and time constant means for stereoscopically distorting said representations in a lateral direction as viewed as in accordance with the time-decay characteristic of said time constant means, the distortion being therefore inversely proportional as the spacing between the local station which comprises said oscilloscopes and the distant objects, said means for stereoscopic distortion comprising means for deriving from the circuits anterior to the oscilloscopes pulses corresponding to those simultaneously transmitted to the distant objects, rectifying means therefor, a condenser in series with said rectifying means, so as to be adapted to be charged by the rectified pulses, a resistance in parallel with said condenser, so that the potential across at least a part of it represents the decaying potential of the charged condenser, means for impressing said potential on said oscilloscopes in push-pull relation to achieve said distorting bias, and means in circuit with said resistance-condenser combination and rectifier for adjusting the time of incidence of the pulses on said rectifier and combination to thereby correspondingly adjust the apparent stereoscopic viewpoint along the axis connecting the distant objects and actual observation point, all whereby to achieve a perception of depth by the stereoscopic effect of binocular vision.

11. A radio pulse reflector type of object locating system comprising two cathode-ray oscilloscopes, means for generating radio pulses, means for transmitting the same and later receiving said pulses after reflection from distant objects including antenna means for two-dimensional scanning of said objects by the radio beam which embodies said pulses, means operating synchronously with said antenna scanning means for scanning the visual fields of said oscilloscopes, and means for amplitude modulating the oscilloscope beams as in accordance with the received reflected radio pulses, all whereby like facsimile representations of the distant objects are impressed on the visual fields of said oscilloscopes, together with an optical stereoscopic viewer for said representations and time constant means for stereoscopically distorting said representations in a lateral direction as viewed as in accordance with the time-decay characteristic of said time constant means, the distortion being therefore inversely proportional as the spacing between the local station which comprises said oscilloscopes and the distant objects, the means for scanning the visual field of at least one oscilloscope including an additional distorting means operative with respect to at least one of the two directions of scanning and, with respect to each said direction taken separately, being similar in circuit and in effect to the first-mentioned distorting means, all whereby to achieve a perception of depth by the stereoscopic effect of binocular vision and to effectively laterally displace, as desired, the apparent viewpoint.

12. A radio pulse reflector type of object locating system comprising two cathode-ray oscilloscopes, means for generating radio pulses, means for transmitting the same and later receiving said pulses after reflection from distant objects including antenna means for two-dimensional scanning of said objects by the radio beam which embodies said pulses, means operating synchronously with said antenna scanning means for scanning the visual fields of said oscilloscopes, and means for amplitude modulating the oscilloscope beams as in accordance with the received reflected radio pulses, all whereby like facsimile representations of the distant objects are impressed on the visual fields of said oscilloscopes, together with an optical stereoscopic viewer for said representations and time constant means for stereoscopically distorting said representations in a lateral direction as viewed as in accordance with the time-decay characteristic of said time constant means, the distortion being therefore inversely proportional as the spacing between the local station which comprises said oscilloscopes and the distant objects, said means for stereoscopic distortion comprising means for deriving from the circuits anterior to the oscilloscopes pulses corresponding to those simultaneously transmitted to the distant objects, rectifying means therefor, a condenser in series with said rectifying means, so as to be adapted to be charged by the rectified pulses, a resistance in parallel with said condenser, so that the potential across at least a part of it represents the decaying potential of the charged condenser, means for impressing said potential on said oscilloscopes in push-pull relation to achieve said distorting bias, means in circuit with said resistance-condenser combination and rectifier for adjusting the time of incidence of the pulses on said rectifier and combination to thereby correspondingly adjust the apparent stereoscopic viewpoint along the axis connecting the distant objects and actual observation point, and means associated with the scanning means for at least one direction and for at least one oscilloscope for distorting the representation in a corresponding direction to an extent substantially inversely proportionally to a desired apparent lateral displacement of viewpoint, all whereby to achieve a perception of depth by the stereoscopic effect of binocular vision and whereby, when considered with said means for producing an apparent axial change of viewpoint, it is possible to change the apparent viewpoint to any point in space.

13. A stereoscopic radar system comprising, means for generating pulse radio waves, a transmitting and receiving antenna organization for transmitting said waves and for subsequently receiving said waves after reflection from distant objects and including means for two-dimensional scanning of said objects by said radio wave, a pair of cathode-ray oscilloscope tubes including elevation and azimuth deflecting means, means for two-dimensional scanning of the visual field of each of said tubes synchronously with the radio two-dimensional scanning of said distant objects, means responsive to the received reflected waves for amplitude modulating the cathode-rays of said tubes, all whereby to impress like substantially facsimile representations of the distant objects on the visual fields of said tubes, an optical device for stereoscopically viewing said representations, and a pulse operated means synchronized with the radio transmission of like pulses for relatively biasing, in push-pull relation, the pairs of deflecting means of said tubes which are specific, as to direction of deflection, to the lateral plane of the eyes in the operation of said optical viewer, said biasing being substantially inversely proportional as the time of propagation of said waves to said distant objects, said biasing means comprising a relaxation network and rectifier, all whereby to achieve a stereoscopic distortion of said representations.

14. A stereoscopic radar system comprising, means for generating pulse radio waves, a transmitting and receiving antenna organization for transmitting said waves and for subsequently receiving said waves after reflection from distant objects and including means for two-dimensional scanning of said objects by said radio wave, a pair of cathode-ray oscilloscope tubes including elevation and azimuth deflecting means, means for two-dimensional scanning of the visual field of each of said tubes synchronously with the radio two-dimensional scanning of said distant objects, means responsive to the received reflected waves for amplitude modulating the cathode-rays of said tubes, all whereby to impress like substantially facsimile representations of the distant objects on the visual fields of said tubes, an optical device for stereoscopically viewing said representations, and a pulse operated means synchronized with the radio transmission of like pulses for relatively biasing, in push-pull relation, the pairs of deflecting means of said tubes which are specific, as to direction of deflection, to the lateral plane of the eyes in the operation of said optical viewer, said biasing being substantially inversely proportional as the time of propagation of said waves to said distant objects, said biasing means comprising, in serial relation in the direction of energy flow toward the oscilloscope deflecting means, a rectifier for the pulses and a condenser shunted by a resistance, and a connection from said resistance to said deflecting means whereby after an initial charge of the condenser by the rectified pulses the deflecting bias potential on said deflecting means is substantially inversely proportional to the elapsed time after said charging, all whereby to achieve a stereoscopic distortion of said representations.

15. A stereoscopic radar system comprising, means for generating pulse radio waves, a transmitting and receiving antenna organization for transmitting said waves and for subsequently receiving said waves after reflection from distant objects and including means for two-dimensional scanning of said objects by said radio wave, a pair of cathode-ray oscilloscope tubes including elevation and azimuth deflecting means, means for two-dimensional scanning of the visual field of each of said tubes synchronously with the radio two-dimensional scanning of said distant objects, means responsive to the received reflected waves for amplitude modulating the cathode-rays of said tubes, all whereby to impress like substantially facsimile representations of the distant objects on the visual fields of said tubes, an optical device for stereoscopically viewing said representations, and a pulse operated means synchronized with the radio transmission of like pulses for relatively biasing, in push-pull relation, the pairs of deflecting means of said tubes which are specific, as to direction of deflection, to the lateral plane of the eyes in the operation of said optical viewer, said biasing being substantially inversely proportional as the time of propagation of said waves to said distant objects, said biasing means comprising, in serial relation in the direction of energy flow toward the oscilloscope deflecting means, a rectifier for the pulses and a condenser shunted by a resistance, and a connection from said resistance to said deflecting means whereby after an initial charge of the condenser by the rectified pulses the deflecting bias potential on said means is substantially inversely proportional to the elapsed time after said charging, together with means for determining the time of incidence of said pulses on said rectifier, all whereby to change the apparent viewpoint of said distant objects in said representations to a desired position along the direction of the axis connecting the distant objects and oscilloscopes.

16. A stereoscopic radar system comprising, means for generating pulse radio waves, a transmitting and receiving antenna organization for transmitting said waves and for subsequently receiving said waves after reflection from distant objects and including means for two-dimensional scanning of said objects by said radio wave, a pair of cathode-ray oscilloscope tubes including elevation and azimuth deflecting means, means for two-dimensional scanning of the visual field of each of said tubes synchronously with the radio two-dimensional scanning of said distant objects, means responsive to the received reflected waves for amplitude modulating the cathode-rays of said tubes, all whereby to impress like substantially facsimile representations of the distant objects on the visual fields of said tubes, an optical device for stereoscopically viewing said representations, and a pulse operated means synchronized with the radio transmission of like pulses for relatively biasing, in push-pull relation, the pairs of deflecting means of said tubes which are specific, as to direction of deflection, to the lateral plane of the eyes in the operation of said optical viewer, said biasing being substantially inversely proportional as the time of propagation of said waves to said distant objects, said biasing means comprising in serial relation in the direction of energy flow toward the oscilloscope deflecting means, a rectifier for the pulses and a condenser shunted by a resistance, and a connection from said resistance to said deflecting means whereby after an initial charge of the condenser by the rectified pulses the deflecting bias potential on said means is substantially inversely proportional to the elapsed time after said charging, with a potential regulating means anterior to said rectifier and resistance-condenser combination for determining the scope of the effect thereof, all whereby to correspondingly adjust the apparent stereoscopic depth of view of said distant objects.

CASSIUS C. CUTLER.

References Cited in the file of this patent
UNITED STATES PATENTS

| Number | Name | Date |
|---|---|---|
| 2,301,254 | Carnahan | Nov. 10, 1942 |
| 2,408,050 | De Rosa | Sept. 24, 1946 |
| 2,426,979 | Ayres | Sept. 9, 1947 |
| 2,434,897 | Ayres | Jan. 27, 1948 |
| 2,449,542 | Ayres | Sept. 21, 1948 |
| 2,514,828 | Ayres | July 11, 1950 |